United States Patent [19]

Sheu

[11] Patent Number: 5,670,127
[45] Date of Patent: Sep. 23, 1997

[54] PROCESS FOR THE MANUFACTURE OF NITRIC OXIDE

[75] Inventor: Lien-Lung Sheu, Scotch Plains, N.J.

[73] Assignee: The BOC Group, Inc., New Providence, N.J.

[21] Appl. No.: 533,821

[22] Filed: Sep. 26, 1995

[51] Int. Cl.$^6$ ................................... C01B 21/24
[52] U.S. Cl. ..................... 423/405; 423/400; 423/523
[58] Field of Search ............................. 423/405, 400, 423/522, 523

[56] References Cited

U.S. PATENT DOCUMENTS 3,446,587  5/1969  Jockers ...................... 423/405

FOREIGN PATENT DOCUMENTS 1174748  7/1964  Germany ...................... 423/405
661903  11/1951  United Kingdom ............. 423/405

*Primary Examiner*—Wayne Langel
*Attorney, Agent, or Firm*—Coleman R. Reap; Salvatore P. Pace

[57] ABSTRACT

Nitric oxide is produced by reacting aqueous nitric acid with gaseous sulfur dioxide in a gas-liquid contact reactor. The reaction is conducted in the presence of a stoichiometric excess of nitric acid to minimize the production of byproduct nitrous oxide and nitrogen. The nitric oxide product gas is chilled sufficiently to freeze most of the water and byproduct nitrogen dioxide contained in the nitric oxide product gas. Residual nitrogen dioxide can be removed by adsorptive separation using an adsorbent which preferentially adsorbs nitrogen dioxide.

9 Claims, 1 Drawing Sheet

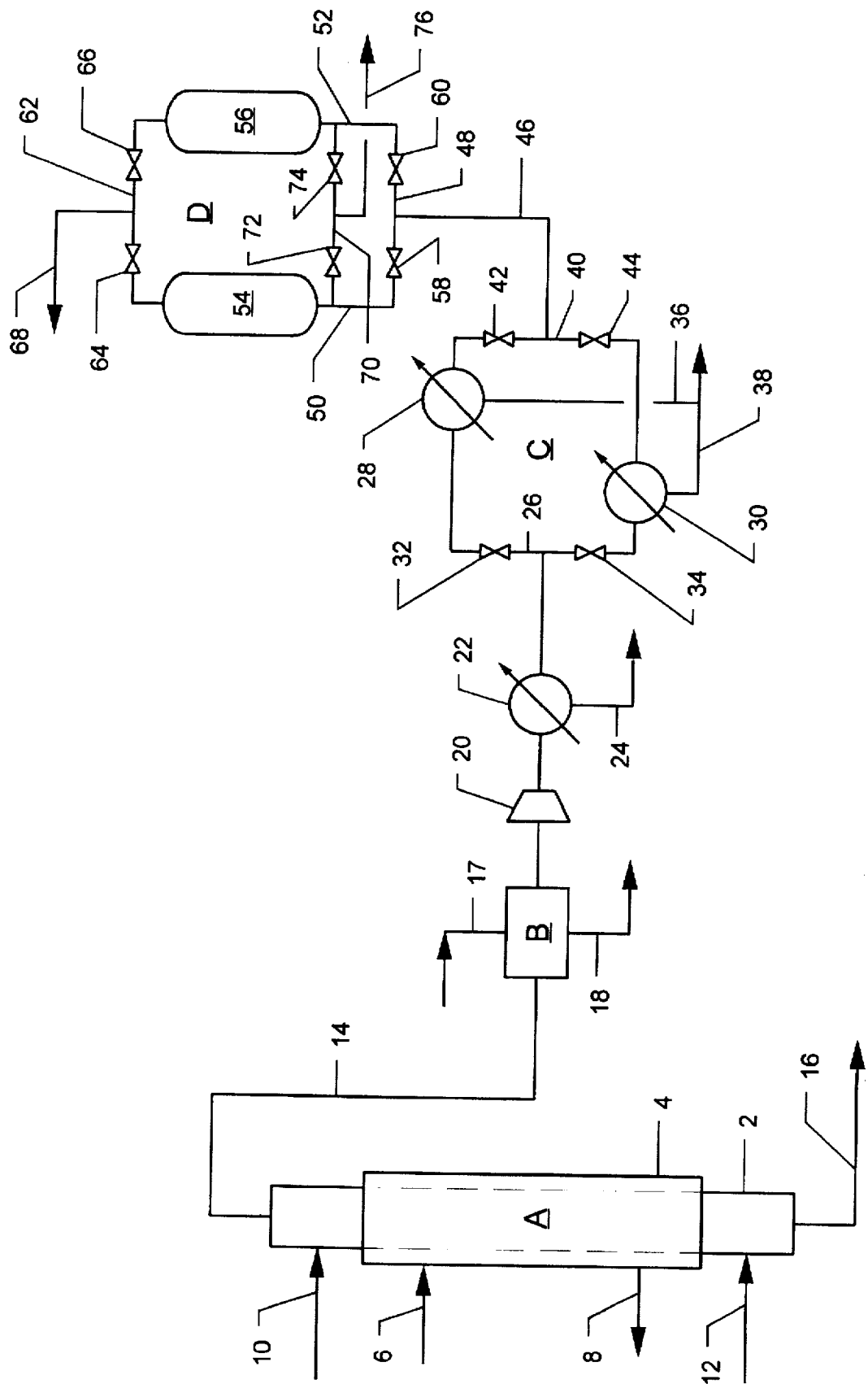

PROCESS FOR THE MANUFACTURE OF NITRIC OXIDE

FIELD OF THE INVENTION

This invention relates to the manufacture of nitric oxide, and more particularly to the manufacture of high purity nitric oxide by the reaction of aqueous nitric acid with gaseous sulfur dioxide.

BACKGROUND OF THE INVENTION

Nitric oxide has recently been found to play an important role in life processes in humans and animals. For example, it helps maintain blood pressure by dilating blood vessels, and kills foreign invaders in the body's immune system. Studies indicate that extraordinary benefits may be obtained by administering small dosages of nitric oxide to patients who suffer from certain illnesses or diseases. Of particular interest is the prospect of reducing pulmonary vasoconstriction in pediatric patients with congenital heart disease complicated by pulmonary artery hypertension by having the patients inhale oxygen-enriched air containing very small concentrations of nitric oxide. The final dosage product of "inhaled nitric oxide" is produced by mixing pharmaceutical-grade nitric oxide with inert ingredients and/or other active substances. Pharmaceutical-grade nitric oxide must be of a very high purity to meet the standards set by the U. S. Food and Drug Administration (FDA).

Nitric oxide can be produced by a variety of methods. A method which is particularly desirable because of the ready availability of the reactant materials is the reaction of aqueous nitric acid solution with gaseous sulfur dioxide. This reaction is discussed in the article "A Chemical Exchange System for Isotopic Feed to a Nitrogen and Oxygen Isotope Separation Plant" appearing in Separation Science and Technology, vol 24, (5 & 6), pp 414–428 (1989). This reaction can be carried out by contacting the reactants in a trickle bed reactor, with aqueous nitric acid being introduced at the top of the bed and the gaseous sulfur dioxide being introduced at the bottom of the bed. In the above article it is suggested that the reaction be conducted with a nitric acid flow of slightly in excess of the stoichiometric amount for the reaction, to help prevent the passage of sulfur dioxide out of the reactor. The gaseous reaction product, which is predominantly nitric oxide, contains as impurities water vapor and small amounts of other nitrogen oxides. The principal nitrogen oxide impurities are nitrogen dioxide and nitrous oxide. To meet FDA standards for pharmaceutical-grade nitric oxide, the product gas must be substantially free of nitrogen dioxide and nitrous oxide.

Because of the importance of the emerging medical uses of pharmaceutical-grade nitric oxide, manufacturing improvements which will facilitate the production of pharmaceutical-grade nitric oxide are continuously sought. The present invention presents a nitric oxide manufacturing technique that provides such an improvement.

SUMMARY OF THE INVENTION

The invention comprises an improvement to a nitric oxide manufacturing process which results in the production of a gaseous nitric oxide product which contains little or no nitrous oxide. The improved process comprises contacting aqueous nitric acid solution with gaseous sulfur dioxide in a trickle bed gas-liquid contact zone at a temperature in the range of about 20 to about 150° C. and at a pressure in the range of about 0.5 to about 5 bara (bar, absolute), with the nitric acid entering the contact zone at a nitric acid to sulfur dioxide molar ratio of at least about 0.7:1. The upper limit of the nitric acid to sulfur molar ratio is not critical and, in general, is determined primarily by economics. It is generally not economically feasible to conduct the reaction at nitric acid to sulfur dioxide molar ratios greater than about 10:1. The weight ratio of water to nitric acid in the aqueous nitric acid solution is usually in the range of about 0.3:1 to about 10:1.

In a more preferred embodiment of the invention, the nitric acid and sulfur dioxide enter the gas-liquid contact zone at a nitric acid to sulfur dioxide molar ratio in the range of at about 1:1 to about 1.5:1, and the weight ratio of water to nitric acid in the aqueous nitric acid solution entering the gas-liquid zone is in the range of about 1:1 to about 5:1.

In another preferred embodiment, the nitric oxide gas product is pressurized to at least about 30 bara and chilled to a temperature of less than about −40° C., and more preferably to a temperature in the range of about −40° to a temperature of about 1° to about 5° C. above the boiling point of nitric oxide, thereby producing a substantially moisture-free nitric oxide gas product containing not more than about 10 ppm nitrogen dioxide. In a most preferred aspect of this embodiment, nitric oxide product gas is compressed to a pressure greater than about 35 bara, for example about 35 to 50 bara, and cooled to a temperature of less than about −50° C., for example a temperature in the range of about −50° to a temperature of about 1° to about 5° C. above the boiling point of nitric oxide.

In another preferred embodiment, moisture is condensed from the pressurized nitric oxide gas product by cooling the gas to a temperature in the range of about 2° to about 10° C., and then nitrogen dioxide and additional moisture are removed from the partially dried product gas by chilling it to a temperature in the range of about −40° to a temperature about 1° to about 5° C. above the boiling point of nitric oxide.

In another preferred embodiment the nitric oxide product gas is first scrubbed with water or dilute aqueous nitric acid to remove nitrogen dioxide from the product gas, then the nitrogen dioxide-depleted product gas is compressed to a pressure in the range of 30 to about 50 bara and cooled to a temperature in the range of about 2° to about 10° C. to remove moisture from the product gas, and then the nitrogen dioxide-depleted and moisture depleted gas product is chilled to a temperature in the range of about −40° to a temperature of about 1° to about 5° C. above the boiling point of nitric oxide to remove additional moisture and nitrogen dioxide. In a more preferred aspect of this embodiment, the dried, nitrogen dioxide-depleted nitric oxide product gas is passed through an adsorbent which selectively adsorbs nitrogen dioxide, thereby reducing the concentration of nitrogen dioxide in the product gas to less than about 5 ppm.

BRIEF DESCRIPTION OF THE DRAWINGS

The sole drawing figure illustrates apparatus in which the preferred embodiment of the invention can be carried out.

DETAILED DESCRIPTION OF THE INVENTION

Nitric oxide is produced, according to the process of the invention, by reacting aqueous nitric acid with gaseous sulfur dioxide. The principal reaction occurring in the process is:

$$2HNO_3 + 2H_2O + 3SO_2 \rightarrow 2NO\uparrow + 3H_2SO_4$$

The gas product produced in the reaction is comprised predominantly of nitric oxide (NO). Nitrogen dioxide ($NO_2$) is also produced in amounts up to about 3 vol. % of the gas product. Other products that may be produced are nitrous oxide ($N_2O$) and nitrogen ($N_2$). Since pharmaceutical-grade nitric oxide must be substantially free of other nitrogen oxides, it is important to conduct the reaction under conditions that minimize the production of nitrogen and nitrogen oxides other than nitric oxide. As can be seen from the above reaction the stoichiometric molar ratio of nitric acid to sulfur dioxide for nitric oxide production is 2:3. When the molar ratio of nitric acid to sulfur dioxide is less than the stoichiometric value, nitrous oxide and nitrogen are produced as byproducts of the process. Thus, to avoid the formation of these byproducts, it is important that the ratio of nitric acid to sulfur dioxide throughout the reaction zone be at least 2:3. It has been discovered that very little or no nitrous oxide and nitrogen are produced in the reactor when nitric acid and sulfur dioxide are introduced into the reaction zone at nitric acid to sulfur dioxide molar ratios of at least 1:1. Conducting the reaction at nitric acid to sulfur dioxide ratios at or above this value ensures that the molar ratio of nitric acid to sulfur dioxide in all parts of the reaction zone will be stoichiometric or greater, and thus the production of nitrous oxide and nitrogen is substantially eliminated.

The invention can be better understood from the accompanying drawing. Auxiliary equipment, including valves, compressors and heat exchangers, that is unnecessary for an understanding of the invention have been omitted from the drawing to simplify discussion of the invention.

Illustrated in the drawing is a system for producing nitric oxide which includes, as major equipment components, a gas-liquid contact reactor, A, an optional gas scrubber, B, a nitrogen dioxide removal unit C, and an optional gas adsorption system D. Reactor A can be any type of gas-liquid contact reactor, but it preferably comprises a glass, glass-lined, or stainless steel trickle bed column, 2. Column 2 may be filled with random packing or structured packing, and it is provided with suitable heat exchange means, such as cooling jacket 4, to remove heat from the reaction zone. Cooling jacket 4 is provided with cooling water inlet and discharge lines 6 and 8, respectively. Located at or near the top of column 2 is aqueous nitric acid feed line 10, and at or near the bottom of the column is sulfur dioxide gas inlet line 12. Also located at the top of column 2 is product gas discharge line 14, and also located at the bottom of the column is waste liquid discharge line 16.

In the embodiment of the invention illustrated in the drawing, the downstream end of line 14 is connected to the inlet of gas scrubber B. Scrubber B is provided with scrubbing liquid inlet and discharge lines 17 and 18, respectively. The outlet end of scrubber B is connected by conduit to the inlet end of compressor 20. On its outlet end, compressor 20 is connected via conduit to the feed gas inlet end of water condenser 22. Condenser 22 is provided with a condensate drain line 24. The gas outlet end of condenser 22 is connected to inlet manifold 26 of nitrogen dioxide freezing unit C. Manifold 26 is connected to the inlets of nitrogen dioxide freezers 28 and 30. Flow between manifold 26 and freezers 28 and 30 is controlled by valves 32 and 34, respectively. Freezers 28 and 30 are provided with nitrogen dioxide discharge lines 36 and 38, respectively, which join and discharge to a downstream waste disposal system. The gas outlet end of nitrogen dioxide freezers 28 and 30 are connected to manifold 40. Flow between freezer 28 and manifold 40 is controlled by valve 42, and flow between freezer 30 and manifold 40 is controlled by valve 44. Line 46 connects manifold 40 to feed gas manifold 48 of gas adsorption unit D. Manifold 48 is connected to lines 50 and 52, which, in turn, are connected to the inlets of adsorption vessels 54 and 56, respectively. Flow through lines 50 and 52 is controlled by valves 58 and 60, respectively. The nonadsorbed gas outlet end of vessels 54 and 56 are connected to nonadsorbed gas manifold 62. Flow between vessels 54 and 56 and manifold 62 is controlled by valves 64 and 66, respectively. Manifold 62 is connected to nonadsorbed gas discharge line 68. Desorbed gas manifold 70 connects lines 50 and 52. Flow between lines 50 and 52 and manifold 70 is controlled by valves 72 and 74, respectively. Manifold 70 is connected to desorbed gas discharge line 76.

In carrying out the process of the invention, an aqueous nitric acid solution containing about $\frac{1}{11}$ to about $\frac{1}{1.3}$ and preferably about $\frac{1}{6}$ to about $\frac{1}{2}$ by weight nitric acid is introduced into reactor 2 through line 10. The nitric acid solution is evenly distributed across the top of the reactor to establish a uniform flow of nitric acid downwardly through column 2. At the same time, gaseous sulfur dioxide is introduced into the bottom of column 2 through line 12. The sulfur dioxide flows through a gas distributor (not shown) positioned in the bottom of column 2, to establish an even flow of sulfur dioxide upwardly through column 2. The nitric acid and sulfur dioxide enter column 2 at a nitric acid to sulfur dioxide molar ratio of at least 0.7 to 1, and these reactants preferably enter at a molar ratio of at least 1 to 1. As the reactants pass through column 2 they come into intimate contact and react to produce nitric oxide product gas. Because the ratio of nitric acid to sulfur dioxide everywhere in column 2 is significantly greater than the stoichiometric ratio, very little or no nitric acid is reduced to nitrous oxide or nitrogen. Furthermore, the ratio of water to sulfur dioxide entering column 2 is sufficient to minimize nitrogen dioxide formation during the reaction stage of the process. Sulfuric acid waste, together with excess nitric acid and water leave column 2 via line 16 and are sent downstream to a spent acid treatment facility (not shown).

The reaction between the nitric acid and the sulfur dioxide is exothermic. It is desirable to maintain the reaction temperature at a temperature below the boiling point of the aqueous solution. Accordingly, column 2 is provided with cooling means capable of maintaining the temperature in all parts of column 2 at below about 150° C., and preferably at about 50° to about 120° C. This can be accomplished by, for example, passing a coolant, such as cool water, through cooling jacket 4, which surrounds column 2. The coolant enters and exits the jacket through lines 6 and 12, respectively.

The overhead gas product from column 2, which is comprised substantially of nitric oxide, but also contains up to about 3 volume percent water and nitrogen dioxide as impurities, is next treated to remove these impurities. The gas product passes through line 14 and, in the embodiment illustrated in the drawing, enters scrubber B. In scrubber B the gas is contacted with water or a dilute aqueous solution of nitric acid, which enters scrubber B through line 16. The water or nitric acid solution scrubs nitrogen dioxide from the gas product, and the scrubbing liquid, together with the scrubbed out nitrogen dioxide leaves scrubber B through line 18 and is sent to a waste disposal plant ( not shown). As noted above, scrubber B is not a necessary part of the invention, but it is useful when it is desired to reduce the burden of nitrogen dioxide freezing unit C.

The nitric oxide product gas is next compressed to a pressure of at least about 30 bara, and preferably to a pressure of at least about 35 bara in compressor 20. The compressed gas is then passed through cooler 22, which is maintained at a temperature just above 0° C., for example at about 2° to about 10° C., and preferably at a temperature in the range of about 2° to about 5° C. Water in the product gas is condensed and removed from condenser 22 through condensate line 24. Condenser 22 is likewise not a necessary part of the system of the invention, but is advantageous in that it, too, reduces the burden on freezing unit C.

The compressed product gas next enters manifold 26 of nitrogen dioxide freezing unit C. In the embodiment illustrated in the drawing, unit C comprises a pair of freezers 28, 30, which are operated out of phase, such that one freezer is on line while the other freezer is being regenerated. Unit C can comprise a single nitrogen dioxide freezer, if desired. In such case, unit C will be operated on an intermittent basis and a holding tank (not shown) can be provided in line 14 to collect nitric oxide product gas produced when unit C is not in operation.

When unit C is operating with freezer 28 is in freezing service, valves 32 and 42 are open and valves 34 and 44 are closed, and when freezer 30 is in freezing service, valves 34 and 44 are open and valves 32 and 42 are closed. Product gas passing through the freezer in service is cooled to a temperature below the freezing point of nitrogen dioxide (−11.2° C.), but above the freezing point of nitric oxide (−163.6° C.), typically to a temperature in the range of about −40° C. to about 1° to 5° C. above the boiling point of nitric oxide, and preferably to a temperature in the range of about −50° C. to about 1° to 5° C. above the boiling point of nitric oxide. During this step substantially all of the nitrogen dioxide and any water vapor remaining in the product gas are frozen and removed from the product gas. While freezer 28 is in nitrogen dioxide freezing service, frozen nitrogen dioxide in freezer 30 is thawed by, for example, heating the frozen nitrogen dioxide by circulating a warm gas or liquid through the freezer, or by means of an electric heater, or by a combination of these techniques. The thawed nitrogen dioxide is removed from freezer 30 via line 38 and sent to a downstream waste disposal unit (not shown). When a predetermined amount of nitrogen dioxide accumulates in freezer 28, this freezer is taken out of service for regeneration, and freezer 30, which has completed its regeneration step, is put into nitrogen dioxide freezing service.

The dry and nitrogen dioxide-depleted product gas passes out of freezer unit C through valve 42 in manifold 40. This gas, which now generally contains less than about 10 ppm nitrogen dioxide, can be collected as is in high pressure storage vessels, or it can be further purified to remove most of the residual nitrogen dioxide remaining in the gas. The embodiment illustrated in the drawing includes an adsorption plant for further purifying the nitric oxide product gas. In this embodiment, the nitric oxide product gas leaving freezer unit C passes through line 46 to adsorption plant D. Plant D typically is a cyclic adsorption unit, such as a pressure swing adsorption (PSA) unit. Adsorption plant D comprises a pair of adsorption vessels, 54 and 56, which are operated out of phase, such that one adsorption vessel is in adsorption service while the other is being regenerated. Each of vessels 54 and 56 contains and adsorbent which adsorbs nitrogen dioxide. Details of the adsorption step, including the particular adsorbent used in the units, form no part of the invention. These details are disclosed in copending U.S. patent application Ser. No. 08/271,592, filed Jul. 7, 1994, the disclosure of which is incorporated herein by reference.

When vessel 54 is in adsorption service and the adsorbent in vessel 56 is being regenerated, valves 58, 64 and 74 are open, and all other valves are closed. Product gas passing through line 46 at an elevated pressure enters vessel 54 through line 50. As the gas passes through the bed in vessel 54 nitrogen dioxide is adsorbed from the gas. The purified gas passes out of vessel 54 through manifold 62, and is sent to downstream storage or to other treatment facilities through line 68. Meanwhile vessel 56 is being countercurrently depressurized through line 52, valve 74 and line 76. The desorbed gas is sent to a downstream disposal facility (not shown). As the adsorption step proceeds, a nitrogen dioxide adsorption front forms in vessel 54 and moves cocurrently through the adsorption vessel. When the adsorption front reaches a predetermined point in vessel 54, adsorption in this vessel is terminated. Valves 58, 64 and 74 are closed and valves 60, 66 and 72 are opened, and vessel 54 enters the bed regeneration phase while vessel 56 the adsorption phase of the cycle. The product gas exiting adsorption plant D generally has a nitrogen dioxide content of less than about 5 ppm.

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis.

EXAMPLE 1

A glass reactor three feet long and having an inside diameter of one inch and packed with stainless steel random packing was used for this example. Sulfur dioxide was passed upwardly through the reactor at a flow rate of 49.4 millimoles/min and aqueous nitric acid containing 25 weight percent nitric acid was passed downwardly through the reactor at a flow rate of 15.53 g/min, which amounts to a nitric acid to sulfur dioxide molar ratio of about 1.25 to 1. The reactor was operated at about 100° C. and slightly above atmospheric pressure. During the run the concentration of nitrogen in the gaseous effluent from the reactor varied from about 50 to 1500 ppm, the concentration of nitrous oxide varied from about 20 to about 50 ppm and the balance was water vapor and nitric oxide. Only trace amounts of nitrogen dioxide were detected in the effluent.

The example illustrates that when reacting nitric acid with sulfur dioxide with a stoichiometric excess of nitric acid relative to the concentration of sulfur dioxide, very small amounts of nitrogen and nitrous oxide are produced in the reaction.

Although the invention has been described with particular reference to specific equipment arrangements and to specific experiments, these features are merely exemplary of the invention and variations are contemplated. The scope of the invention is limited only by the breadth of the appended claims.

What is claimed is:

1. In a process for the production of nitric oxide comprising contacting aqueous nitric acid solution with gaseous sulfur dioxide in a gas-liquid contact zone thereby producing a product gas comprising nitric oxide, the improvement wherein the nitric acid and sulfur dioxide are introduced into the contact zone at a nitric acid to sulfur dioxide molar ratio of at least 0.7:1 and contacted therein at temperature in the range of about 50° to about 120° C., thereby producing a nitrous oxide- and nitrogen-depleted nitric oxide product gas.

2. The process of claim 1, wherein the weight ratio of water to nitric acid in the nitric acid solution is in the range of about 0.3:1 to 10:1.

3. The process of claim 1, wherein the nitric acid and sulfur dioxide are introduced into the contact zone at a nitric acid to sulfur dioxide molar ratio of at least 1:1.

4. The process of claim 1, wherein nitrogen dioxide is removed from said product gas by compressing the product gas to a pressure of at least about 20 bara and cooling it to a temperature not higher than about −40° C.

5. The process of claim 4, wherein the product gas is compressed to a pressure of at least about 35 bara and cooled to a temperature not greater than about −50° C.

6. The process of claim 4, wherein prior to compressing said product gas, nitrogen dioxide is removed from said product gas by scrubbing it with water or a dilute aqueous nitric acid solution.

7. The process of claim 4, wherein the nitrogen dioxide-depleted product gas is passed through an adsorbent which selectively adsorbs nitrogen dioxide, thereby reducing the concentration of nitrogen dioxide in the product gas to less than about 5 ppm.

8. The process of claim 4, wherein the weight ratio of water to nitric acid in the nitric acid solution is in the range about 1:1 to about 5:1.

9. The process of claim 1, wherein moisture and nitrogen dioxide are removed from the product gas by compressing the product gas to a pressure of at least about 20 bara and cooling to about 1° to about 5° C., thereby condensing moisture therefrom, and then cooling the partially dried product gas to a temperature not higher than about −40° C., thereby freezing nitrogen dioxide therefrom.

\* \* \* \* \*